July 27, 1937.  G. F. DALY ET AL  2,088,408
MULTIPLYING MACHINE WITH IMPROVED CHECKING MEANS THEREFOR
Filed Jan. 5, 1933     13 Sheets-Sheet 1
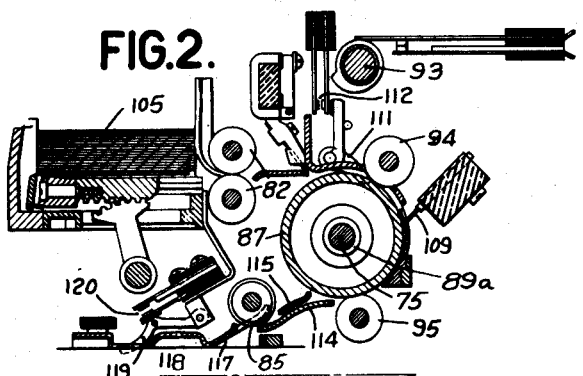
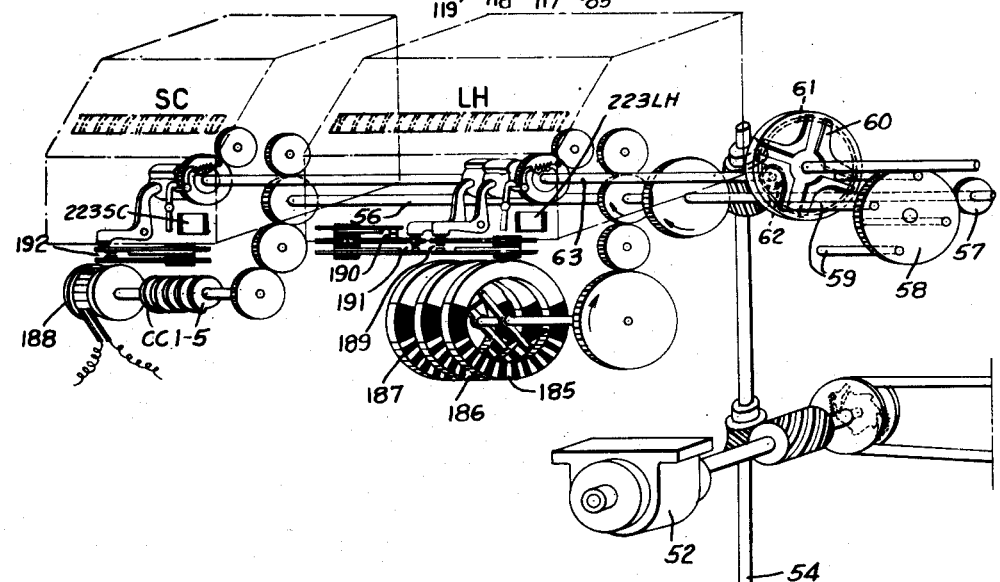
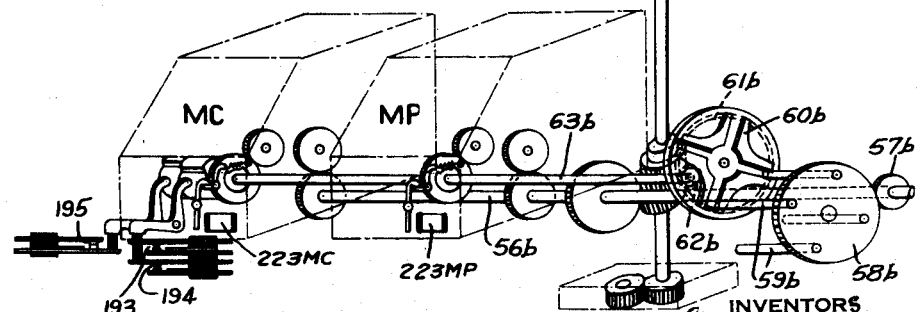
INVENTORS
George F. Daly
John L. Ryan
BY
Cooper, Kerr & Dunham
ATTORNEYS July 27, 1937.   G. F. DALY ET AL   2,088,408
MULTIPLYING MACHINE WITH IMPROVED CHECKING MEANS THEREFOR
Filed Jan. 5, 1933    13 Sheets-Sheet 2
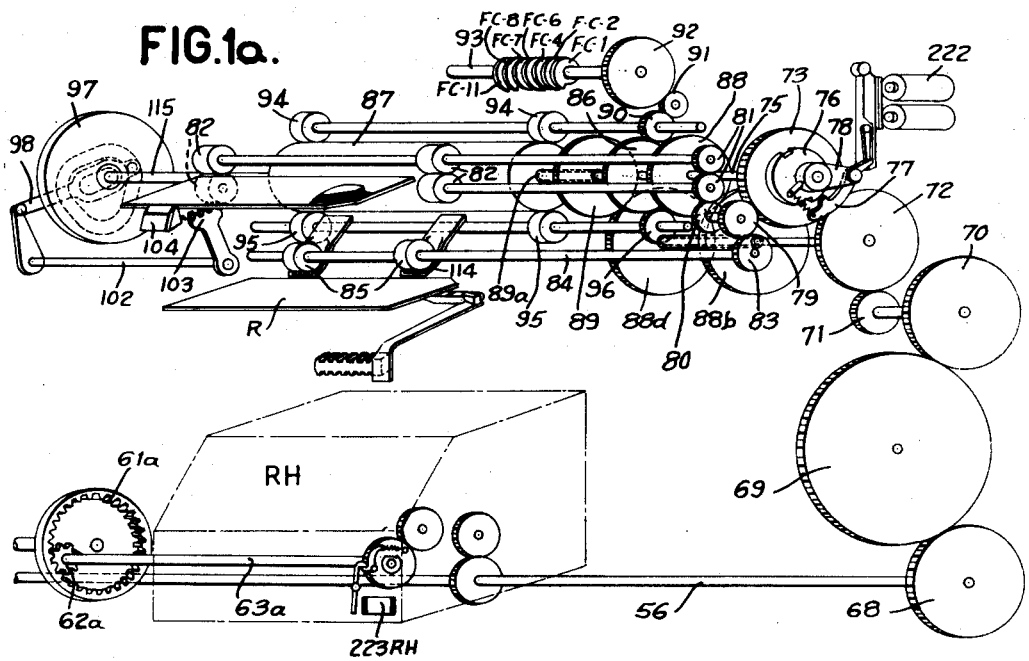
FIG.1a.
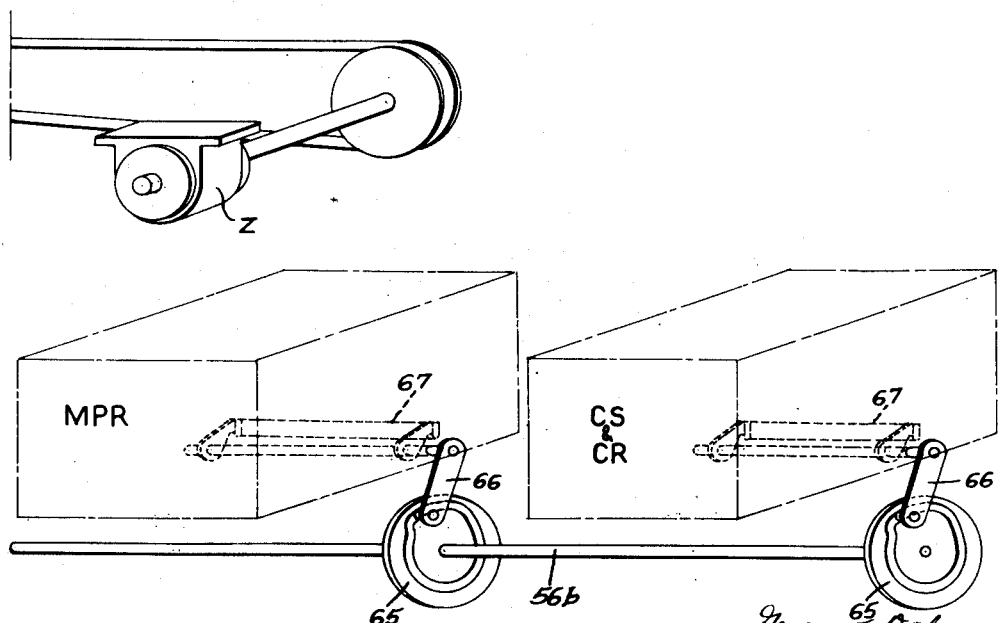
George F. Daly
John L. Ryan
INVENTORS
BY
Cooper, Kerr + Dunham
ATTORNEYS

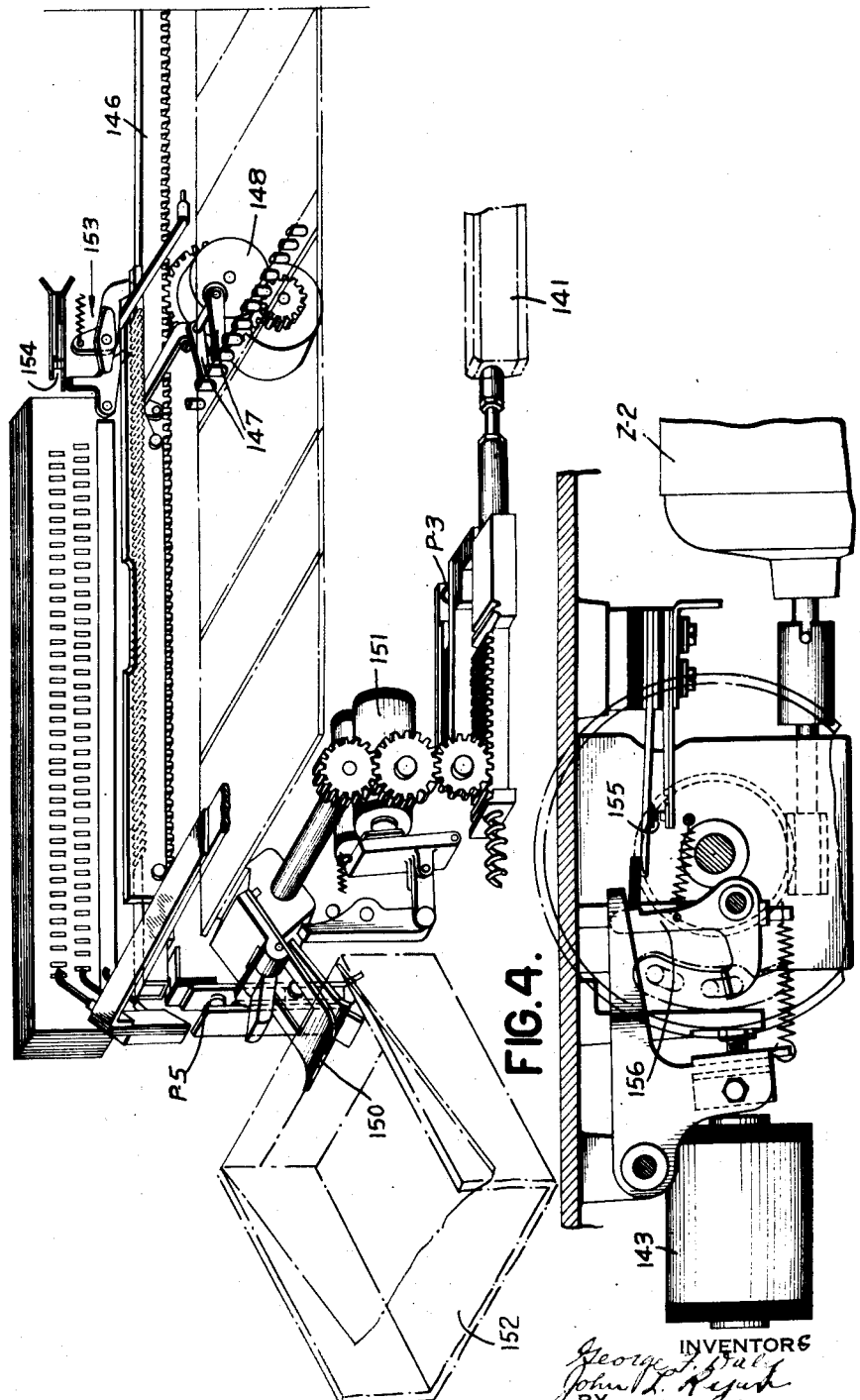

July 27, 1937. G. F. DALY ET AL 2,088,408
MULTIPLYING MACHINE WITH IMPROVED CHECKING MEANS THEREFOR
Filed Jan. 5, 1933 13 Sheets-Sheet 4
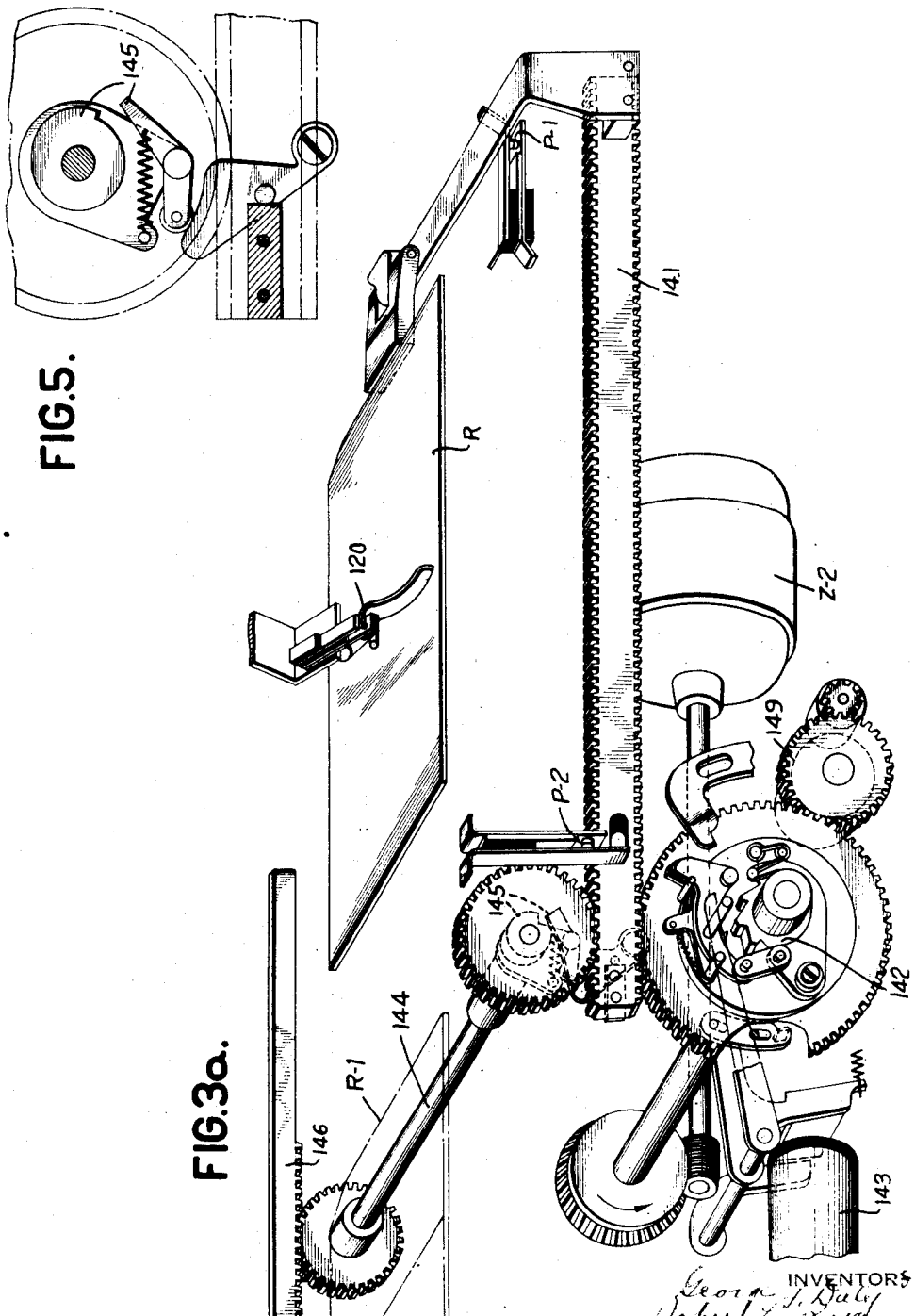

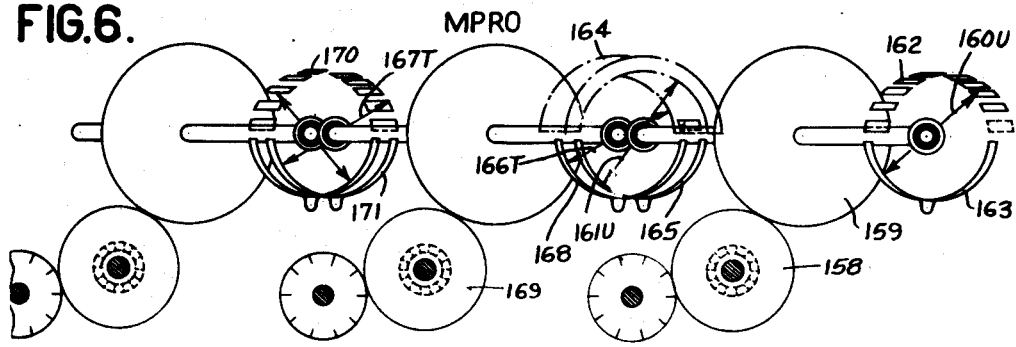
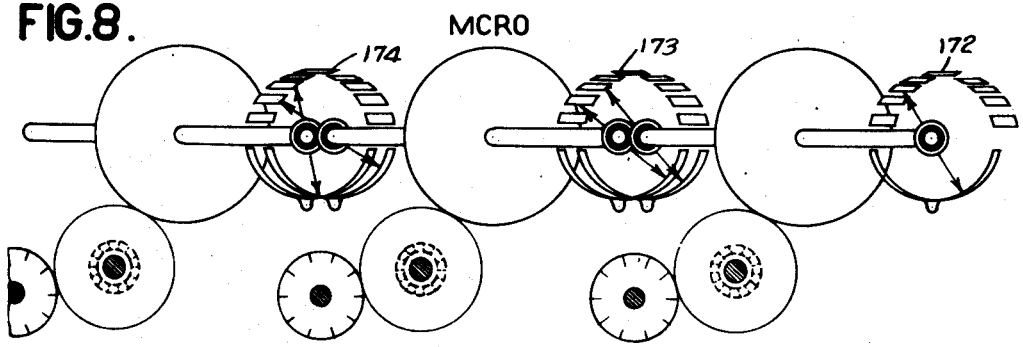
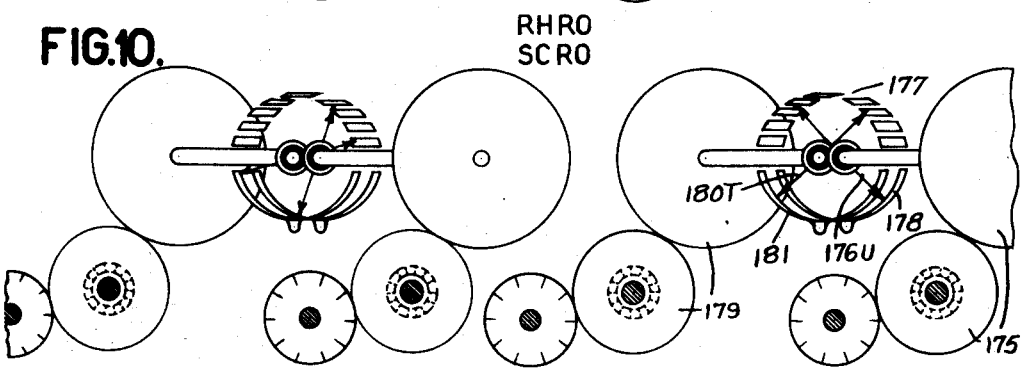
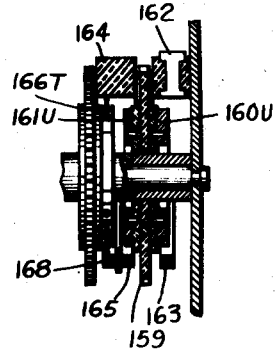
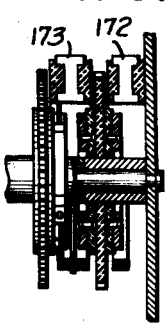
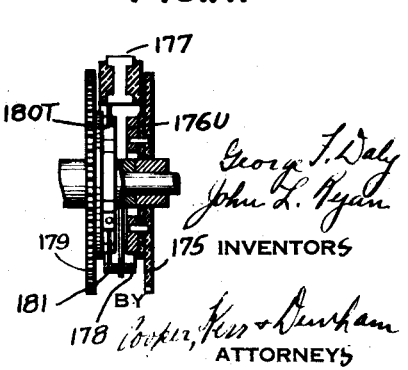

July 27, 1937.　　　G. F. DALY ET AL　　　2,088,408
MULTIPLYING MACHINE WITH IMPROVED CHECKING MEANS THEREFOR
Filed Jan. 5, 1933　　　13 Sheets-Sheet 6
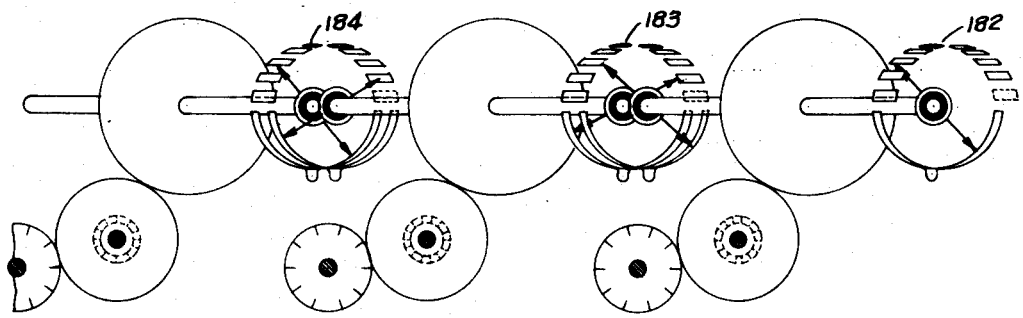
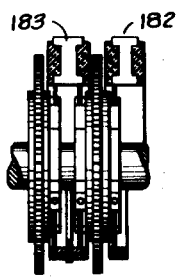
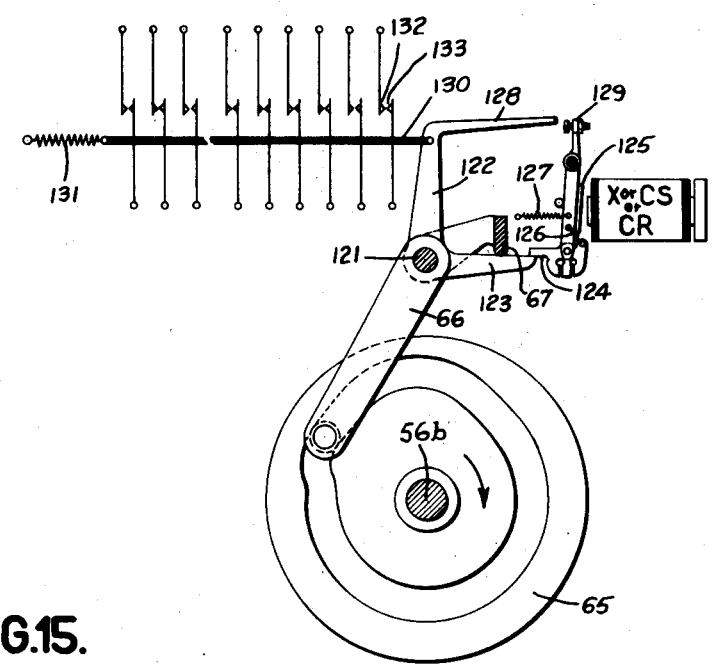
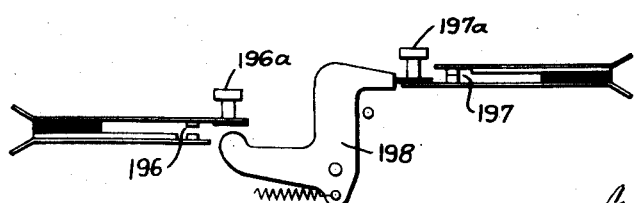

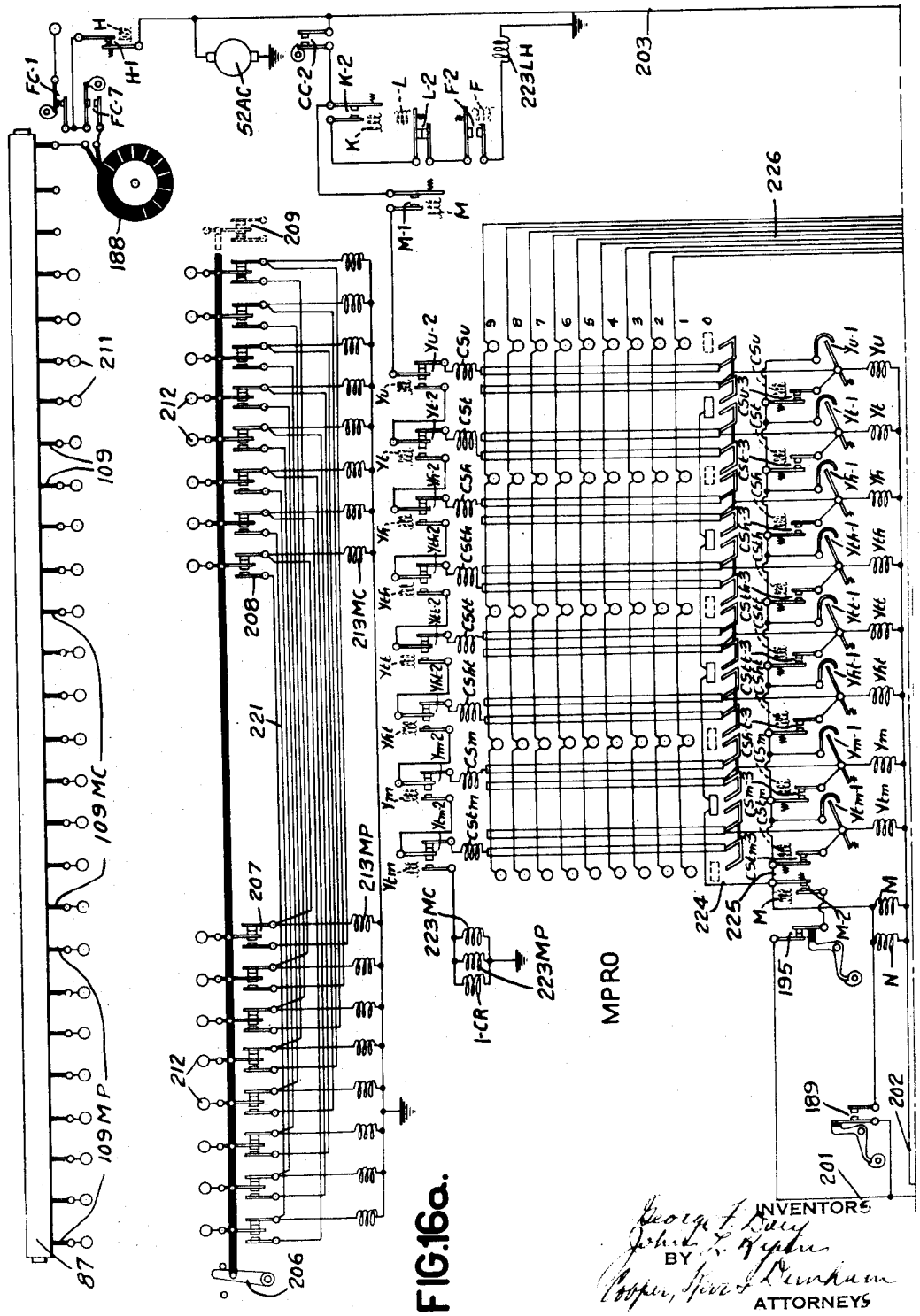

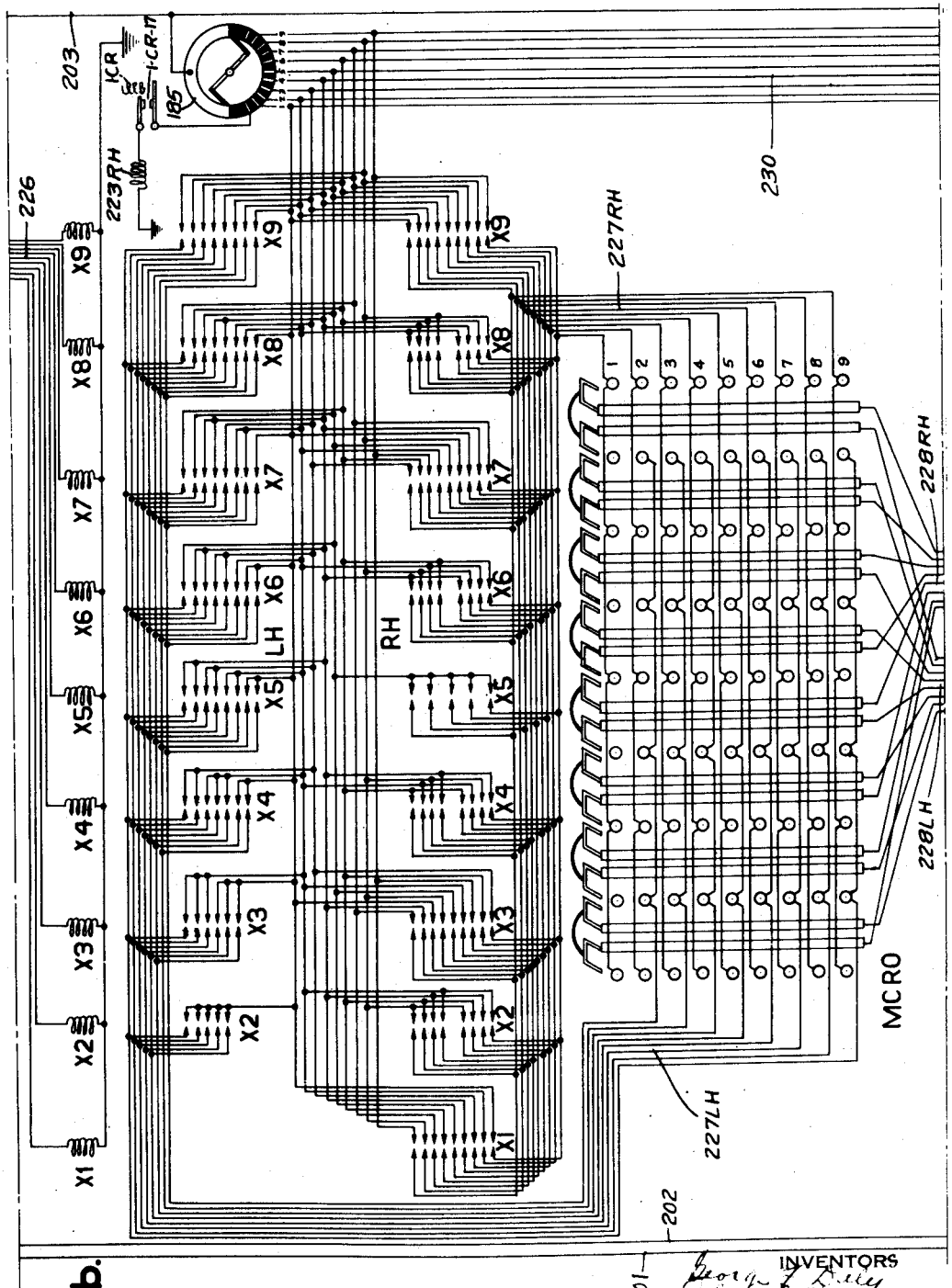

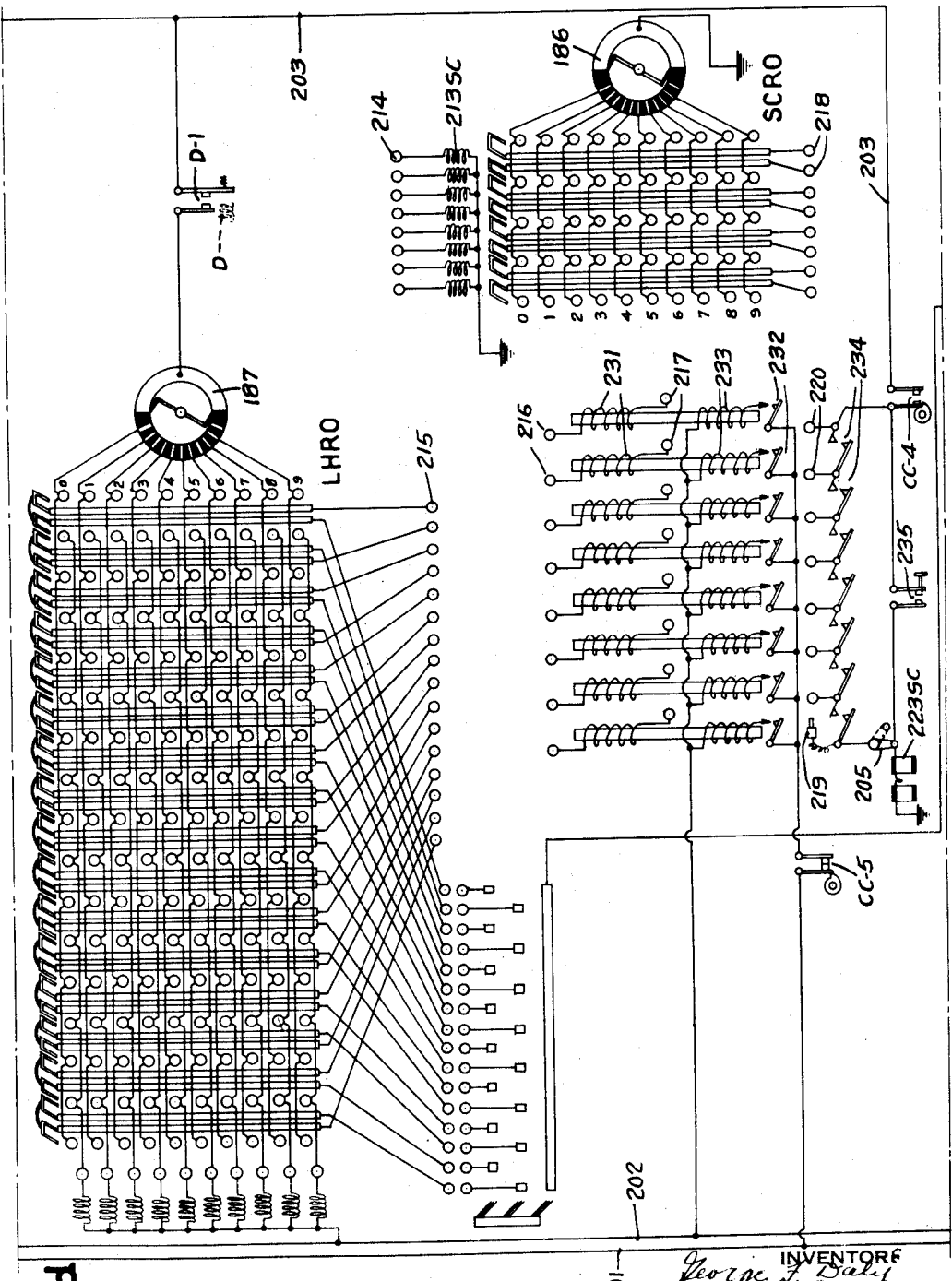

July 27, 1937.  G. F. DALY ET AL  2,088,408
MULTIPLYING MACHINE WITH IMPROVED CHECKING MEANS THEREFOR
Filed Jan. 5, 1933  13 Sheets-Sheet 11
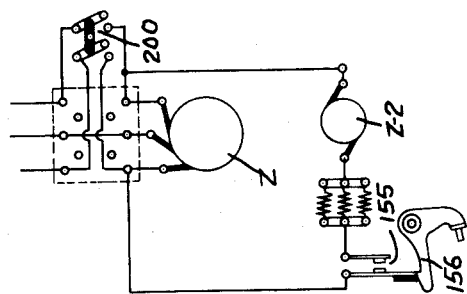
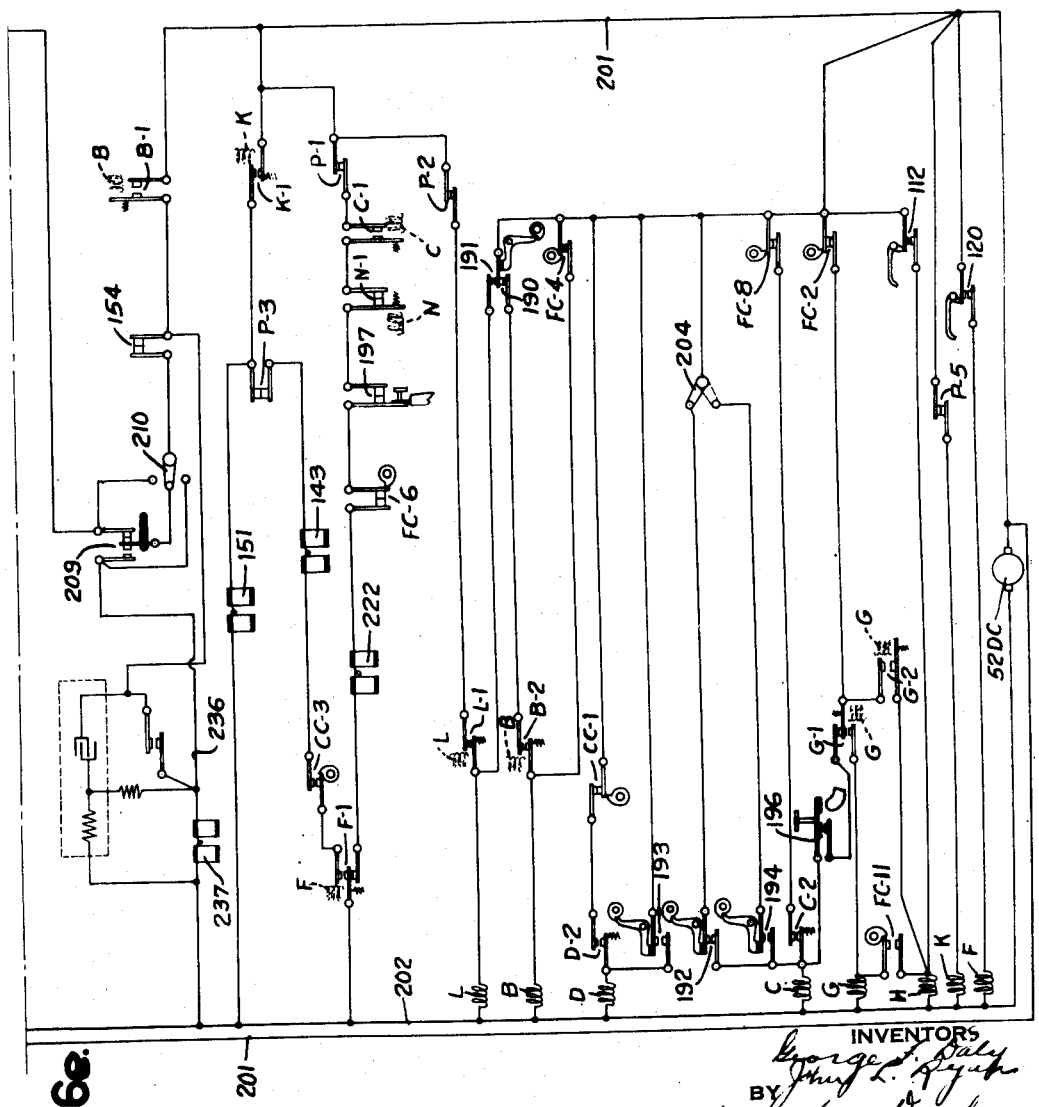
FIG.16e.
INVENTORS
George F. Daly
BY
ATTORNEYS

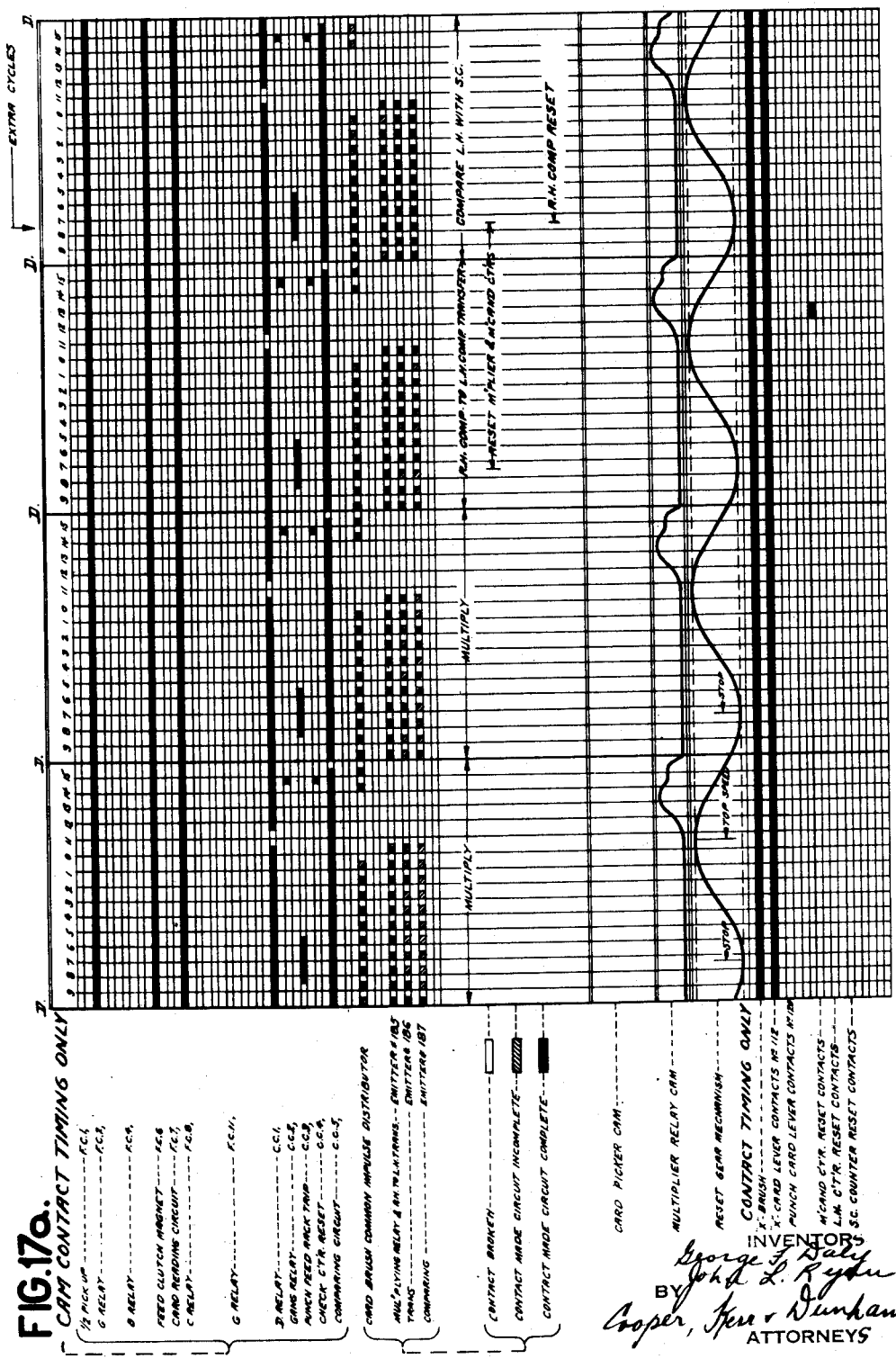

Patented July 27, 1937

2,088,408

UNITED STATES PATENT OFFICE 2,088,408

MULTIPLYING MACHINE WITH IMPROVED CHECKING MEANS THEREFOR

George F. Daly, Johnson City, N. Y., and John L. Ryan, Indianapolis, Ind., assignors, by mesne assignments, to International Business Machines Corporation, New York, N. Y., a corporation of New York Application January 5, 1933, Serial No. 650,246

23 Claims. (Cl. 235—61.6)

This invention relates to improvements in record controlled multiplying machines.

Many users of multiplying machines insist that on certain classes of work all computations be checked and verified for accuracy. Such checks are and have been required heretofore where multiplying operations are effected by computing machines in which the entries are made by hand and accordingly the practice of requiring checking has been carried over into the record controlled multiplying machine art where entries are made automatically by machine operations under record card control.

Furthermore, in the use of automatic record controlled machines, occasionally the operator of the machine makes faulty settings of certain machine controls or fails to properly or fully insert the plug connections. At other times damaged cards are introduced into the supply magazine of the machine and such cards sometimes fail to properly feed through the punch, causing faulty or missing recording of product results in certain columns of the records. Sometimes while a result may be properly computed by the machine the punching section of the machine may not properly record the product, due to maladjustment of the punch which may be caused by the operator improperly setting up the machine for desired product punching.

All of the foregoing have brought about some demand for checking adjuncts upon a record controlled multiplying machine to enable a series of previously made and recorded computations to be re-checked for accuracy of the computations and the accuracy of the recorded results.

Heretofore, checking operations on these record controlled multiplying machines have been carried out by group checking in contradistinction to individual record checking and the checks have been made as to the accuracy of the machine made computations in contradistinction to checking the accuracy of the previously recorded product result and the checking of such previously recorded result with a re-computed calculated amount. Checking has been performed heretofore by summarizing the computed products obtained upon the first run of the records through the machine and then comparing such product summary with a new re-calculated summary of products. If the two product summaries matched the set of records were considered correct. Such methods previously employed did not (1) localize an incorrectly computed record; (2) localize a correctly computed record carrying an incorrectly recorded product. Furthermore, if the products were correctly computed on the first run but certain of the products were incorrectly recorded, the observation of the summary counter-readings did not in any way point out the presence in a group of records of correctly computed records with incorrectly recorded products thereupon.

Accordingly, the present invention has for its objects the provision of improved checking adjuncts, attachments and devices for record controlled multiplying machines which will enable not only a check to be made upon previously computed computations, but which will also provide for the checking of the previously recorded product result and to the provision of means whereby an incorrect record, which carries an incorrect product due to either a previous erroneous computation or to a previous erroneous recording of a correctly computed result, may be definitely and quickly localized and separated from a large group of correctly computed and recorded records.

A further object of the present invention resides in the provision of an improved checking means for a record controlled computing machine which will enable quick checking and comparing operations to be made of the previously computed products as previously recorded with a re-computed and checked product and for accurately, quickly and definitely localizing the records with the incorrect product results thereon.

A further object of the present invention resides in the provision of a checking attachment and supplementary checking controls for a multiplying machine which will enable the machine to be run at the usual normal high speed for first run multiplying and recording operations and which will enable checking operations to be performed on the same machine with a minimum loss of speed and with the minimum of extra machine cycles for checking purposes.

Further and other objects of the present invention will be hereinafter set forth in the companying specification and claims and shown in the drawings, which by way of illustration show what is now considered to be a preferred embodiment of the invention.

Before describing the construction and operation of the machine in detail, the general mode of operation of the machine may be briefly alluded to. The first run operations in which the products are computed and results recorded on the cards are first performed in the usual way. After a group of cards have been computed and the results recorded, certain checking switches on the machine are adjusted and the machine is re-plugged so that upon the following check run, on the same set of cards, the machine receives not only an entry of the multiplicand and of the multiplier, but also an entry of the recorded and previously computed product from each card. This product derived from the record is then compared with a re-computed product of the multiplicand and multiplier and upon the re-computing operation the multiplier and multiplicand are preferably reversed. If the re-computed product compares with the product previously computed and derived from the product perforations of the record upon the check run, the machine proceeds automatically to check the next record. If there is a failure of a comparison or any non-matching of the re-computed result with the read in previously computed and recorded product, the machine stops and the incorrect record may be removed by the operator.

In the drawings:

Figure 1 and 1a taken together show a somewhat diagrammatic view of the various units of the machine and the driving mechanism therefor;

Fig. 2 is a vertical sectional view taken through the card handling and reading section of the machine;

Figs. 3 and 3a, taken together show a somewhat diagrammatic view of the punching section of the machine;

Fig. 4 is a sectional detail view of certain parts in the punching section of the machine;

Fig. 5 is another detail view of certain parts of the punch;

Fig. 6 is a diagrammatic view of the readout device for the MP entry receiving device;

Fig. 7 is a fragmentary sectional view showing the construction of the parts of this MPRO readout device;

Figs. 8 and 9 are respectively, diagrammatic and sectional views of the multiplicand readout device;

Figs. 10 and 11 are respectively, diagrammatic and sectional views of the readout device for the RH accumulator. A readout of the same general form is used for the checking accumulator, except that ten segment spots are provided in lieu of nine as in the RH accumulator;

Figs. 12 and 13 are respectively diagrammatic and sectional views of the readout device for the LH accumulator;

Fig. 14 is a view showing one of the electromagnetically controlled mechanically positioned multi-contact relays which are used in the machine for multiplier selection and column shift purposes;

Fig. 15 shows certain latching mechanism which is used on the stop and start keys of the machines;

Figure 16C:
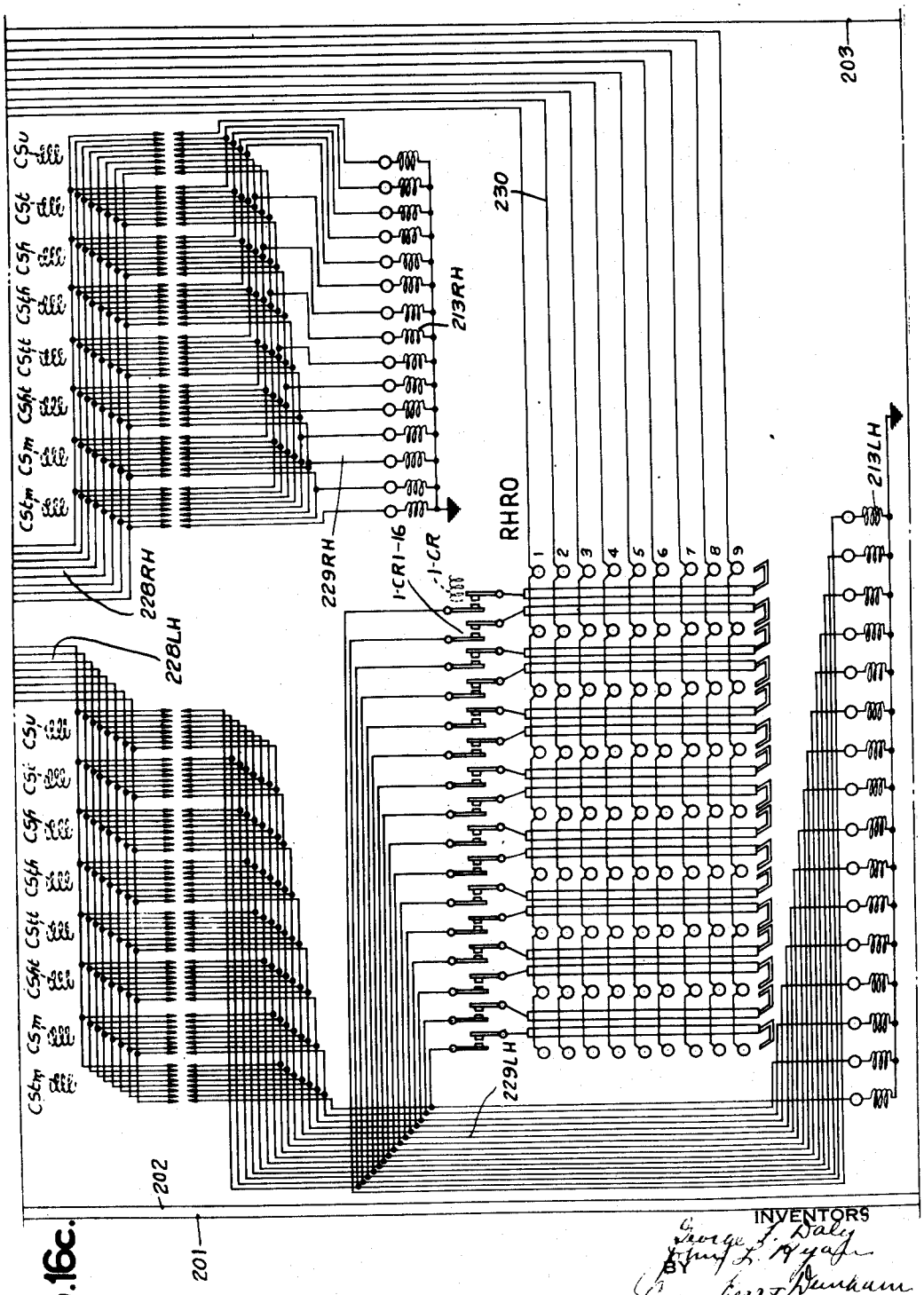
Figure 17B:
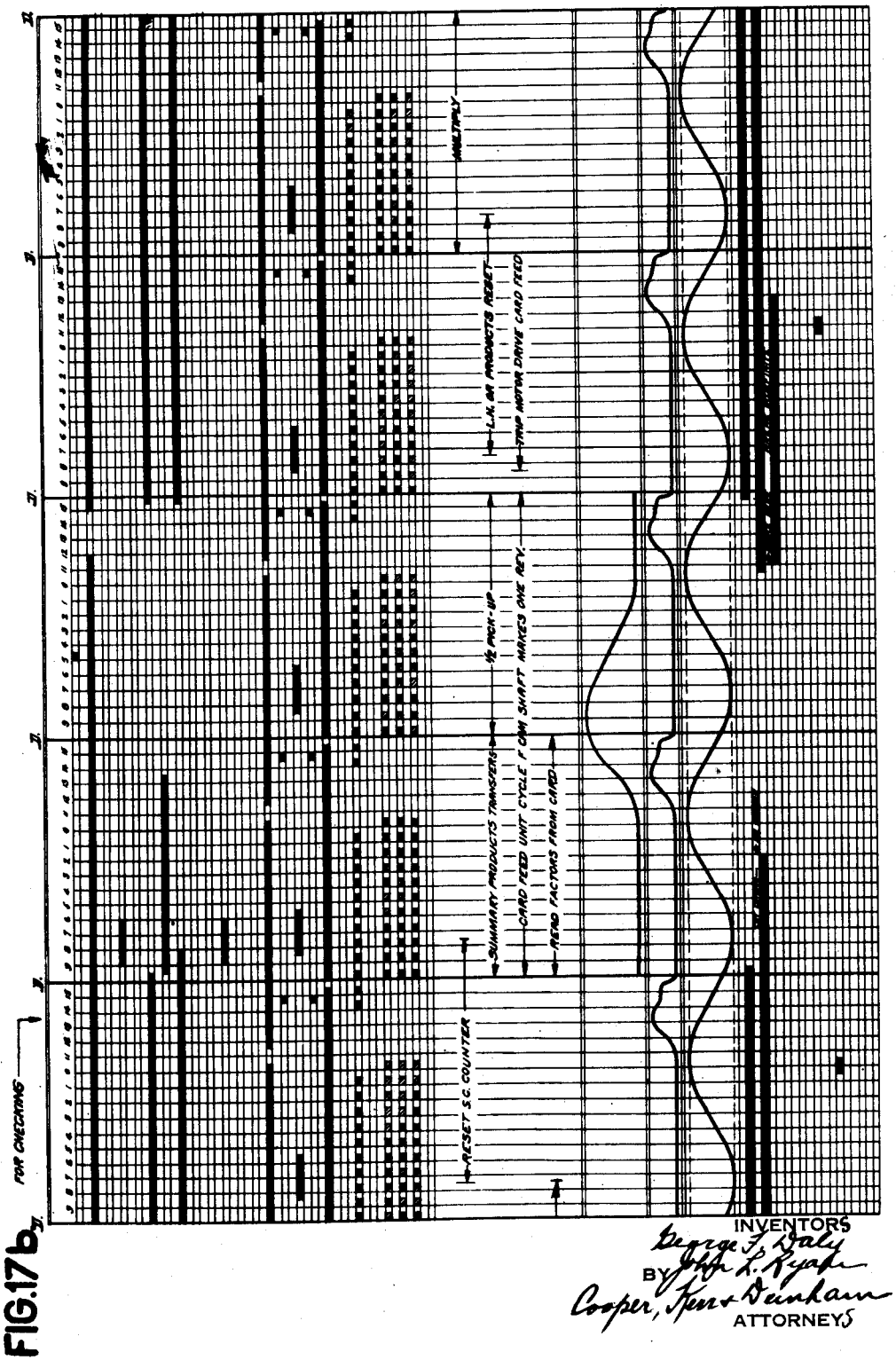

Figs. 16a, 16b, 16c, 16d and 16e, taken together and arranged vertically in the order named, show the complete circuit diagram of the machine; and Figs. 17a and 17b taken together, show the timing diagram of the machine.

A general description will first be given of the units and their location in the machine. The machine embodies a card feed and card handling section (see Figs. 1a and 2) and there is also the usual successively actuated punch which receives each card as the card emerges from the card handling section. The punch is shown in Figs. 3 and 3a and a portion of the punching mechanism, viz. a portion of the receiving tray, is shown in Fig. 2.

The accumulators and receiving devices used are as follows. In the upper part of the machine there is provided the usual RH and LH accumulators designated RH and LH respectively. In lieu of the summary products accumulator heretofore used in machines of this class, a combined summary products and checking accumulator is provided designated SC on Fig. 1. This accumulator is similar in construction to the usual summary products accumulator, but is provided with a readout section. In the lower part of the machine there are two receiving devices which are used as multiplier and multiplicand entry receiving devices which are designated MP and MC on Fig. 1. The lower part of the machine also includes a multiplying relay unit MPR and column shift and control unit generally designated CS and CR.

The usual emitters, cam contact devices and impulse distributor, etc. are likewise provided.

The main upper counter drive shaft 56 is driven in the customary manner from the driving motor Z which also drives the A. C.—D. C. generator 52. The usual Geneva reset drive is provided for the upper reset shaft 63 for the LH and SC accumulators. Such drive comprises parts 57, 58, 59, 60, 61 and 62. The reset shaft 63a for the RH accumulator is driven from the cross element 60 of the geneva, through an internal gear 61a and pinion 62a. The lower main drive shaft 56b is also driven from the vertical connecting drive shaft 54 and reset drive for the lower reset shaft 63b is provided by parts 57b, 58b, 59b, 60b, 61b and 62b.

*Card feed and card handling unit drive*

Referring to Figs. 1a and 2, the customary card feed drive is provided which may be briefly described as follows. Shaft 56 through gearing 68, 69, 70, 71, and 72 drives a gear 73, revolubly mounted on shaft 75. Fixed to gear 73 is the element 76 of the one revolution clutch, the complemental part of which comprises a pawl 77, carried by an arm 78 fixed to shaft 75. Gear 73 through a gear 79 fixed to gear 80, drives a train of gears 81, which in turn drive the card feed rolls 82. Also in train with gear 79 is a gear 83 for driving drag roll shaft 84 carrying drag rolls 85. The usual card transfer and contact cylinder 87 is provided driven in the following manner. Fixed on shaft 75 is a gear 88 which, through gearing 88b, 88d, drives a gear 89 which is fixed to the sleeve 89a revolubly mounted on shaft 75 but fixed to the card transfer and contact roll 87. The intermittently actuated FC group of cam contact devices are driven in the following manner. A driving train is provided from gear 86 which gear is fixed to shaft 75 and which train includes gearing 90, 91 and 92, the latter gear being fixed to the cam contact shaft 93. Fixed to the shaft of gear 90 are spring pressed card feed rolls 94. Other spring pressed card feed rolls 95 are driven by the gear 96. The card picker is driven in the customary manner by a box cam 97 fixed on shaft 75 cooperating with the follower 98 which rocks a rock shaft 102 carrying a gear sector 103 which is in engagement with the picker block 104. Upon engagement of the one revolution card feed clutch, the picker is called into action to withdraw a single card from the magazine 105 (Fig. 2) and advance the card into the bite of rolls 82, which rolls in turn forward the card to the card transfer and contact roll 87. A curved card guide is provided around the transfer and contact cylinder and the advancing card is carried around by the forward rotation of the cylinder and by the rotation of rolls 94 to traverse the card past the main sensing brushes designated 109 in Fig. 2. Also in cooperation with the card is a pivoted card lever 111 operating card lever contacts 112.

After sensing, the card is advanced by the rolls 95 and cylinder 87 between guiding members 114 and 115, and while between these members it is advanced by drag rolls 85. The drag rolls 85 deliver the card under the guiding member 117 and ultimately the card is flipped down into the tray of the punching section of the machine. The location of the tray is indicated at 118 in Fig. 2 and the position of a card in this tray is indicated at R in Fig. 1a.

A card lever 119 (Fig. 2) is provided adjacent the tray for closing card lever contacts 120 when a card is in the tray.

When the machine is to be used for checking purposes with the traverse of the card past the main sensing brushes 109, the amount of the multiplier and the amount of the multiplicand will be read from the card and will be entered into the MP and MC receiving devices of the machine. The amount of the previously punched product will also be read from the card and such a previously computed and punched product amount will be entered into the SC accumulator of the machine.

Multi-contact relays

The machine includes a number of electromagnetically controlled and tripped multi-contact relays. These are used in the MPR, CS and CR sections of the machine. The mechanical drive for these relays is provided for in the following manner. The lower drive shaft 56b drives operating cams 65 (see Figs. 1a and 14). Cooperating with each cam 65 is a follower arm 66 which is adapted to rock a bail 67. Loosely mounted on shaft 121 are a number of U-shaped members 122 each provided with an arm portion 123 extending under the bail 67 and cooperating with a latch member 124 which is pivotally mounted on the armature member 125 and spring urged in an anti-clockwise direction by a spring 126. The armature is normally rocked clockwise by a spring 127. Each member 122 has an armature knockoff arm 128 adapted to cooperate with a knockoff extension 129 of the armature. Also fixed to each member 122 is an insulated contact operating part 130 which is normally drawn to the left by a spring 131. The contacts 132 and 133 are provided, the latter 133 being fixed to the member 130. Upon the full movement of 130 to the left the contacts 132 and 133 will close.

In the operation of this multi-contact relay, the bail 67 is first displaced to the position shown and arm 123 is slightly depressed to relieve the strain from the latch point where 123 cooperates with 124. A relay magnet X, CS or CR may then be energized, swinging the armature 125 to the right causing the latch 124 to clear 123 and snap down under spring action by spring 126 to a position at the end of member 123. Thereafter upon further motion of the cam 65 in the direction indicated by the arrow, the bail 67 is elevated allowing an anti-clockwise motion of member 122 and permitting the contacts to close under spring action. Subsequently further movement of the cam 65 causes the bail 67 to be again depressed to reopen the contacts and to thrust 128 to the right to a supplemental extent to knock off any previously attracted armature. At this time there is a relatching of the latch 124 with member 123. If a given armature is not attracted by the energization of the relay coil, latch 124 will not be tripped and such latch will prevent the anti-clockwise motion of members 122 and the closing of the contacts upon the elevation of bail 67.

In the subsequent description of the wiring diagram, certain of the contacts which have been generally designated 132 and 133 in the foregoing description of the relay, will be given designating numerals related to their associated relay control magnets. Thus 1—CR—1 to 17 will designate the seventeen contacts controlled by the relay magnet 1—CR.

Punching mechanism

The punching mechanism is of the usual successively acting repetition punching type generally used in machines of this class. It is generally of the form shown in Lee and Phillips United States Patent No. 1,772,186 and in British Patent No. 362,529, corresponding to the United States application of Lee and Daly, Serial No. 391,874.

Inasmuch as punching operations are not performed when the machine is to be used for checking purposes, the punching mechanism will not be fully described. It is sufficient to here state that on checking multiplications, the cards are read one by one in the card handling and sensing section of the machine and fed into the punch and then traversed through the punch to the discharge magazine of the punch. It is sufficient to here state that after the receipt of the card in the receiving tray 118 in the punch at the R position and with the punch driving motor Z—2 in operation that a rack 141 is displaced to the left to push the card from the R position to the R—1 position. Movement of the rack 141 to the left is effected by the one revolution punch clutch generally designated 142, which clutch is engaged by the energization of punch clutch magnet 143. The traverse of 141 to the left causes shaft 144 to rotate clockwise by means of the ratchet driving device, generally designated 145 (see also Fig. 5). The clockwise rotational movement of 144 displaces rack 146 to the right to a position in which pusher fingers 147 can engage back of the trailing edge of the card at the R—1 position. Thereafter rack 146 moves to the left under spring power from a spring in barrel 148 and another spring drive at 149 restores rack 141 to its right hand position.

After the card has been passed through the punch it ultimately reaches a position in which the eject mechanism 150 receives the card. Following this there is a trip of the eject mechanism by energization of eject magnet 151 and the eject mechanism swings to the position shown in Fig. 3 to deliver the card into a discharge magazine or box as indicated by the dotted line position of the card in Fig. 3. The box is generally designated 152. The movement of rack 146 to the left is under the influence of the usual escapement 153 and each time the card escapes a column the escapement contacts 154 are opened.

The punching section of the machine is provided with contacts which may be briefly described. Contacts P—1 are contacts which are closed when rack 141 is in extreme right hand position and in proper position to receive a new card from the card handling and sensing section of the machine. Contacts P—2 (Fig. 3a) are contacts which are normally closed and which open when rack 141 is in its extreme left hand position. Contacts P—3 are eject contacts which open up when the eject assemblage 150 is moved to card receiving position. With the eject mechanism in the position as shown such contacts are closed. Contacts P—5 are contacts which are normally open contacts and which close upon the movement of the rack 146 and of the card to beyond the last column position.

Contacts 155 are also provided, which are arranged to be closed upon energization of the punch clutch magnet 143. Such contacts are latched closed by a latch 156 and the latch is released and the contacts are allowed to open by a knockoff associated with the one revolution clutch assembly 142.

Readout devices

Referring to Figs. 6 and 7 which show the MP readout (MPRO), 158 is a clutch gear pertaining to the units order of the MP receiving device. Gear 159 is driven from this clutch gear and this gear in turn drives brush assemblies designated 160U and 161U. 160U traverses segments 162 and current supply segment 163. 161U traverses a segment block 164 provided with a single spot at the zero position and also traverses current supply segment 165. There is also a brush assemblage 166T which traverses the 164 segment and which receives current from a current supply segment 168. This brush assemblage 166T and a brush assemblage 167T is driven from the tens order clutch wheel 169. 167T traverses segment spots 170 and receives current from a supply segment 171. This arrangement of brushes and segments is repeated for the higher orders in the MPRO readout, i. e. each alternate segment is like 164 with only a single spot in the zero position and alternating with such segments are other segments similar to 162 and 170 with a multiplicity of spots on each segment.

The wiring of the MPRO readout will be shown in connection with the description of the circuit diagram.

MCRO Readout

The drive for the multiplicand readout brush assemblies is the same as previously described for the MP readout. The segment arrangement, however, is different. In lieu of the segments 162, 164 and 170, segments 172, 173 and 174 are provided each with a multiplicity of spots as shown, i. e. there are nine spots on each segment.

RHRO and SCRO readouts

With the RHRO and SCRO readouts, a different arrangement is provided. The units order gear train 175 drives a brush assemblage 176U, which traverses segments 177 and which receives current from a conducting segment 178. The tens order train 179 drives a brush assemblage 180T which also traverses the segments 177 and which receives current from a conducting segment 181. This arrangement is repeated for relatively higher orders of the readout.

On the RHRO readout the segments 177 are provided with nine conducting spots and on the SCRO readout ten of such conducting spots are provided.

The wiring of these readouts will appear on the circuit diagram.

LHRO readout

The LHRO readout device has a drive which is similar to the drive for the MPRO and the MCRO readout devices. The arrangement of segments is substantially similar to the MCRO readout device with the exception of the fact that there are ten conducting spots instead of nine as with the MCRO readout device. The reference characters 182, 183 and 184 designate the segments of this LHRO readout. The wiring of the readout will be shown on the circuit diagram.

Emitters and cam contacts

The main drive shaft 56 (see Fig. 1) is adapted to drive the cams of certain CC cam contact devices. These cams are correspondingly numbered on Fig. 1 as CC—1 to 5. Also driven from the shaft 56 are three emitters 185, 186 and 187 which are of conventional construction. An impulse distributor 188 is provided which is driven in unison with the cams CC—1 to 5.

Reset controlled contacts

Referring to Fig. 1, the reset gear of the LH accumulator is provided with a cam adapted upon the reset of this accumulator to cause closure of contacts 189 and to shift a three-blade contact arrangement to open contacts 190 and to close contacts 191. Similarly arranged reset contacts are provided in association with the SC accumulator, i. e. contacts 192 are arranged to close upon the reset of this accumulator. On the MC accumulator in lieu of two contact pairs as heretofore used in previous machines, three contact pairs are provided, viz. 193, 194 and 195. Contacts 193 and 194 are arranged to be closed upon reset of this accumulator and contacts 195 are arranged to be opened upon the reset of this accumulator.

Referring to Fig. 15, 196 are the start key contacts controlled by start key 196a and 197 are the stop key contacts controlled by the stop key 197a. Intermediate the contacts there is a spring urged latch member 198. The arrangement is such that upon the depression of the stop key 197a the latch member 198 will keep stop key contacts 197 open and the start key contacts 196 will also be kept open. Thereafter upon depression of the start key 196a to close the contacts 196, the latch member 198 will be rocked anti-clockwise to release the stop key contacts and to permit their reclosure.

Circuit diagram

It will be understood that the present machine is intended both for the original computation and production of perforated records and for the checking of the product results on records made on a previous computing run. The initial computing runs wherein the records are initially produced and perforated need not be here described in detail. The operations will be described, however, in connection with the performance of check runs and the necessary controls for the performance of check runs to modify the operation of the machine from the performing of computing operations with product punching to a checking operation per se will be here described in detail.

For the present description it will be assumed that cards have been once passed through the machine, the factors read therefrom, the products computed and punched upon the cards. Then if the operator of the machine desires to check the previous computations, the previously computed cards with the products punched thereon are replaced in the card supply magazine 105 of the machine (see Fig. 2). The machine is then set in operation, and when in operation, the multiplier and multiplicand factors are read from each card. The entries into the multiplicand and multiplier receiving devices are reversed, however, so that the previous multiplier becomes the multiplicand and the previous multiplicand becomes the multiplier. This is effected by shiftable contact devices adapted to reverse the circuit connections between the multiplicand and the multiplier reading devices and their respective receiving devices. The machine when in operation for checking purposes is also arranged to read from each previously computed and perforated card the amount of the product peviously computed and perforated. Such product is read from the card at the time when the multiplier and multiplicand factors are read from the card and such previously computed product is entered into the SC accumulator. The machine then proceeds with the computation of the entered and reversed multiplier and multiplicand and ultimately sets up the product of the multiplier and the multiplicand in the LH accumulator. After the final product result is set up in the LH accumulator, the machine goes through a comparing operation to compare the amount of this product with the product which has been read direct from the card and entered into the SC accumulator. If the two products compare, the machine will have ascertained that the previous computation and punching is correct and the machine will then automatically initiate the handling and checking of the following record card. With each record introduced into the machine, the SC accumulator will be cleared so that a new product can be received from the following record and checked with the following computation. If during a check run the product read from the record does not compare or match with the product computed by the operation of the machine, provision is made for automatically stopping the running of the machine. The operator then is apprised that there is a mistake in the calculation or in the punching of the previously computed calculation and the operator can inspect the visible accumulator wheels of the LH accumulator and of the SC accumulator and ascertain the difference in the computation. The erronous card can then be removed from the discharge magazine of the punch and checking on following cards proceeded with.

In setting the machine into operation, previously computed cards are placed in the card magazine of the machine. The operator then closes the main switch 200 providing current supply for the main driving motor Z. The main motor drives the A. C.—D. C. generator 52 and supplies direct current to buses 201 and 202 and alternating current impulses to the bus 203 and to ground.

For running the machine upon a check run, certain switches are thrown to certain positions as will now be set forth. Switch 204 (Fig. 16e) is thrown to the full line position shown for a check run. Switch 205 (Fig. 16d) is also thrown to the full line position as shown for a check run. The manually manipulable member 206 (Fig. 16a) is thrown to reverse position from that shown for checking to throw the set of three-blade contacts 207 and 208 to reverse position to reverse the entries of the multiplier and multiplicand and to also shift certain extra three-blade contacts 209 which are shown in dotted lines on Fig. 16a and in full lines in Fig. 16e. A switch 210 (Fig. 16e) is also thrown to the full line position as shown. This switch is kept in this same position for normal multiplying without checking and for checking.

The multiplier and multiplicand entry circuits are plugged up in the usual way, that is plug connections are made from certain of the plug sockets 211 which are connected to the main sensing brushes 109 to the plug sockets 212. One set of such plug connections are provided for the multiplier and similar plug connections are provided for the multiplicand to direct the entries into the 213MP counter magnets and the 213MC counter magnets. This is the customary plugging in these multiplying machines. From certain of the upper plug sockets 211 which are connected to the brushes which sense the product field on the card, plug connections are made to sockets 214 (see Fig. 16d) which lead to the counter magnets 213SC pertaining to the SC accumulator.

By the aforesaid last mentioned plug connections, entries of the product amount as read from the card will be directly entered into the SC accumulator. For check runs other plug connections are made as follows.

Referring to Fig. 16d, plug connections are made from plug sockets 215 which lead to a section of the LHRO readout device to plug sockets 216 of a comparison control unit. The other plug sockets 217 of this comparison control unit are plugged to plug sockets 218 which are connected to the SCRO readout device. A plug 219 is provided on the control unit which can be plugged into one of the sockets 220 to shunt out unused and unplugged columns in the control unit.

Referring again to Fig. 16a, the cross wiring generally designated 221 is associated with the 207 and 208 three-blade contacts in such a way that with these three-blade contacts shifted to reverse position from that shown, the amount of the multiplier as read by the 109MP brushes will be directed into the multiplicand accumulator, the impulses controlling the 213MC magnets and the multiplicand entries which are read by the 109MC brushes will be entered into the MP accumulator, the impulses controlling the 213MP magnets. The transfer wires 221 and the three-blade contacts 207 and 208 control the transposition of the multiplier and multiplicand.

Having plugged up the machine in the manner above explained, the operator depresses the start key and closes start key contacts 196 (Fig. 16e). Closure of these contacts completes a circuit through relay coil C and through relay contacts G—1 now closed and through cam contacts FC—2. A stick circuit is established through the contacts C—2 of the relay and through cam contacts FC—8 now closed. Energization of coil C also closes contacts C—1 and a circuit is established to energize the card feed clutch magnet 222 (see also Fig. 1a). The circuit is completed from the 202 side of the D. C. line through relay contacts F—1 now in the position shown, through the card feed clutch magnet 222, through cam contacts FC—6 now closed, through stop key contacts 197 now closed, through relay contacts N—1 and C—1 now closed, through contacts P—1 of the punch, now closed, to the other side of the D. C. line 201.

The start key is held depressed until after the second card feed cycle is initiated and until after card lever contacts 112 are closed, causing energization of relay coil H. Energization of coil H closes relay contacts H—1 (Fig. 16a). As the second card feed cycle ensues, the card is carried past the brushes 109 and the amounts of the multiplier and multiplicand and product are read from the card and entered into the multiplicand, multiplier and checking accumulators. The entry circuits need not be traced in detail.

While there is a manual starting up of card feed for the initial card handling cycles, on subsequent card handling cycles card feed is automatically initiated. Provision is accordingly made to cut off the hand initiating control after the initial card handling operations. Early in the second card feed cycle cam contacts FC—11 (Fig. 16e) close to energize relay coil G and shift contacts G—1 to reverse position from that shown interrupting the circuit to the start key contacts 196, but maintaining the circuit to cam contacts FC—2. The energization of coil G will also close relay contacts G—2 and establish a stick circuit for coils G and H either through the FC—2 cam contacts or the card lever contacts 112. The making time of cam contacts FC—2 overlaps the time when the card lever contacts 112 are open between cards.

The first card after being fed through the card handling and sensing section of the machine ultimately passes to the R position in the punch, closing card lever contacts 120, energizing relay coil F, causing the shift of relay contacts F—1 to reverse position from that shown. On starting up the machine, contacts P—1, P—3 and P—5 in the punch are closed. With P—5 closed, relay coil K will be energized and contacts K—1 closed. Upon the shifting of contacts F—1 and upon the closure of cam contacts CC—3, a circuit will be established to the punch clutch magnet 143. This circuit is completed to the other side of the line through the punch contacts P—3 now closed and contacts K—1 which are also closed. The energization of the punch clutch magnet 143 will cause the closure of contacts 155 which become latched closed by latch 156. In this way current is supplied to the punch driving motor Z—2. The card in the R position in the punch is now advanced endwise through the punch in the usual manner.

Initiation of multiplication

In the present machine on multiplying operations the set up of the cycle controller is initiated by the reset of the LH accumulator. The energization of relay coils F and K in the manner previously explained cause closure of contacts F—2 and K—2 (Fig. 16a). Upon closure of cam contacts CC—2 current flows from the 203 side of the line through CC—2 now closed, through K—2 now closed, through relay contacts L—2 now closed, through F—2 now closed, through the 223LH reset magnet (see also Fig. 1) and back to ground. The energization of 223LH initiates the reset of the LH accumulator. The reset of the LH accumulator occurs with the racks in the punch in extreme outer position. During the reset of the LH accumulator, the reset control contacts 191 (Fig. 16e) close and energize relay coil L. Energization of L opens relay contacts L—2 (Fig. 16a) preventing a repetition of reset. Although L is only temporarily energized by the closure of contacts 191, a stick circuit is established for this coil, through contacts L—1 which close upon the energization of L. The stick circuit is completed through the punch contacts P—2 now closed. The cycle controller is set up in the following manner. Upon the reset of the LH accumulator a circuit is established traced as follows: (see Fig. 16a) from the 201 side of the D. C. line, through the reset contacts 189 of the LH accumulator, through relay coils M and N and back to the other side 202 of the D. C. line. The energization of relay coil M closes relay contacts M—1 and M—2 and the latter contacts establish a stick circuit for the relay coils M and N through the multiplicand reset contacts 195 which are now closed.

Column skip and cycle controller

The column skip and cycle controller are fully described in the patent to George F. Daly, Number 2,045,437. It is sufficient to here state that if any brush of the multiplier readout stands upon a zero spot, the corresponding Y relay coil of the cycle controller will be energized. Current will flow in from the D. C. line 201 through the 195 reset contacts, through the relay contacts M—2 now closed, via wire 224, through the zero spots of the MP readout device, then via the corresponding brush or brushes standing on the zero spot or spots, then through the respective circits shown and back to the 202 side of the D. C. line. Also connected to one side of the relay contacts M—2 is a line 225 which extends over and connects with one side of the CSu—3 to CStm—3 control contacts. The other side of these contacts is wired back to their respective Y relay coils and therethrough to the other side of the D. C. line. Accordingly when any Y coil is energized, due to a brush standing on a zero spot in its corresponding column, the energization of this particular Y relay coil will close its Y—1 stick contacts and this Y magnet will remain energized. Assuming that no zero appears in the units column of the amount upon the MP entry device, but that zeros appear in the tens and hundreds columns and that a significant figure appears in the thousands column, there will be an energization of coils Yh and Yt which will shift transfer contacts Yh—2 and Yt—2 to reverse position. Yu—2 will not have been shifted because its corresponding coil Yu had not been energized. Yth—2 will also not have been shifted. The machine is now ready to multiply by the amount in the units order of the MP entry device. Initiation of multiplication is effected in the following manner. The energization of coil M closes relay contacts M—1. Following the setting up of the cycle controller, cam contacts CC—2 close and current flows through these contacts, through contacts M—1 now closed, through the Yu—2 transfer contacts, in the position shown, down through the CSu relay magnet and out via the brush which is standing on the "5" spot of the MP readout in the units order, down through the fifth line of the group of wires generally designated 226 to the X—5 multiplying relay control magnet (see Fig. 16b). There is a concurrent energization of the CSu magnet and the X—5 multiplier magnet. Energization of X—5 selects the proper impulses for multiplication by 5 and the energization of CSu directs the entries in the proper columnar orders of the RH and LH accumulators. Extra control contacts CSu—3 are provided controlled by the CSu relay and the closure of these extra control contacts which takes place as an incident to the flow of current to the X—5 magnet through CS*u*, causes the energization of the Y*u* relay coil, which relay coil was not previously energized because its corresponding readout brush did not stand on a zero spot. The energization of Y*u* then shifts stick contacts Y*u*—1 and transfer contacts Y*u*—2 so that upon the succeeding multiplication by the next significant figure, the current flowing in through M—1 and CC—2 will be diverted by Y*u*—2 over to the Y*t*—2 set of transfer contacts which are in reverse position from that shown, thence over through the Y*h*—2 transfer contacts, in reverse position from that shown, and over to the Y*th*—2 transfer contacts, in the position shown. These Y*th*—2 contacts will not have been shifted since their corresponding brush did not stand upon a zero spot. The next multiplying current impulse then flows through M—1, through Y*th*—2, through CS*th*, over through the brush of the MP readout to the particular wire of the 226 group, say the seventh wire and down through the X—7 magnet and out to ground upon closure of cam contacts CC—2. This current flow will effect a concurrent energization of X—7 and the CS*th* magnet and there will be a proper entry of the partial product amounts into the proper orders of the LH and RH accumulators at shifted over columnar positions therein. The flow of the impulses for entering further partial products need not be traced in detail. It is sufficient to state that upon the energization of an X magnet coil of a multiplying relay that the related contacts shown on Fig. 16*b* are closed and at the proper time in the operation of the machine current impulses flow from the emitter 185 through the multiplying relay control contacts. Such impulses flow through the lines generally designated 227LH and 227RH to the LH and RH sections of the multiplicand readout MCRO. The multiplicand readout device allows selected impulses to flow to the LH component lines 228LH and the RH component lines 228RH. These last mentioned lines extend down through the various contacts of the CS relays, the wiring being as shown in Fig. 16*c*, and the other side of the contacts of these column shift relays connect to the LH and RH lines 229LH and 229RH which respectively extend to the magnets 213LH and 213RH pertaining to the LH and RH accumulators.

After multiplication is complete the transfer circuits in the cycle controller will all be shifted so that there will be an ultimate circuit path from the 203 side of the A. C. line, through CC—2, M—1, through all of the shifted Y—2 set of transfer contacts to the 1—CR relay coil and to the 223MC and 223MP reset magnets. Energization of 223MP and 223MC initiates resetting of the MP and MC devices. Energization of 1—CR brings about a closure of the related contacts 1—CR—1 to 16 (Fig. 16*c*) and 1—CR—17 (Fig. 16*b*). Closure of the 1—CR—1 to 16 contacts connects the RHRO readout with the 229LH lines. Accordingly, upon the operation of emitter 185 impulses are emitted through a group of lines 230 (Figs. 16*b* and 16*c*), through the RHRO readout device (Fig. 16*c*), through the 1—CR—1 to 16 contacts to the magnets 213LH of the LH accumulator. The amount which previously stood on the RH accumulator is entered into the LH accumulator in proper columnar relation therein. After the transfer is complete the emitter brush of emitter 185 on encountering the extra spot supplies current through contacts 1—CR—17 now closed, to the RH reset magnet 223RH. Energization of this magnet initiates reset of the RH accumulator.

MC and MP reset occurs concurrently with the RH and LH transfer and the reset of MC opens contacts 195 (see Fig. 16*a*). The opening of such contacts breaks the stick circuit for relay coils M and N and for all of the Y relay coils, thus preparing the cycle controller for a new entry from the following card.

Upon checking operations, the machine is now ready to compare the computed product which has been finally set up in the LH accumulator with the previously computed product read from the product field of the record card. Such product from the card, it will be remembered, was entered into the SC counter at the time the multiplier and multiplicand amounts were read from the card. Towards the end of the accumulator cycle in which the MC accumulator is being reset, contacts 193 (Fig. 16*e*) close, energizing relay coil D. A stick circuit for D is established through contacts D—2 and CC—1. D remains energized during the next accumulators cycle and causes closure of contacts D—1 (Fig. 16*d*). In the accumulators cycle following the reset of the MC accumulators these contacts D—1 will be closed and current will be supplied from the 203 side of the A. C. line to the emitter 187. The emitter will operate in the usual way to emit impulses through one section of the LHRO readout out to the plug board sockets 215 and through the plug connections to sockets 216 and through control relay pickup relay coils 231 to the plug sockets 217, thence through the plug connections to the 218 sockets of the SCRO readout out through the readout and through the emitter 186 and back to ground. If the amount standing on the LH accumulator matches and compares with the amount standing on the SC accumulator, all of the 231 coils of the control unit which are plugged up will be energized at some time during a comparing reading operation. The energization of a coil 231 will cause closure of related stick contacts 232 to energize the related holding relay coil 233. The energization of coils 233 will maintain contacts 232 closed and will also close related contacts 234 to set up a series comparison circuit through all of the contacts 234. If the amounts compare on the LH and SC counters all of the contacts 234 will be set up and be maintained set up when CC—4 close so that current will flow from the 203 side of the A. C. line, through CC—4, through all of the contacts 234 in series, through switch 205 in closed position as shown, to the 223SC reset magnet. Energization of 223SC will initiate reset of the SC accumulator. Following the comparison, the stick circuit for the holding relay coils 223 is interrupted by the opening of cam contacts CC—5 to prepare the control device for a following comparing operation.

At this point it may be explained that if the 223SC reset magnet is energized there is a reset of this accumulator and then a new card checking operation is initiated. However, in the event that 223SC is not energized, due to the failure of a pair of any one or more pairs of the contacts 234 to close signifying that there is a failure of comparison of the amount upon the LH accumulator with the amount upon the SC accumulator, there will be no reset of the SC accumulator and the machine will stop further card feeding operations. This is more fully explained later.

The operator of the machine can then visually observe the readings on the SC accumulator with the LH accumulator reading and observe the discrepancy in the checked amounts with the amount read from the card. With the machine stopped in this manner upon failure of comparison the card will have stopped part way through the punch at the first product punching position. To remove this card and restart the machine in operation, the operator depresses a special check reset key 235 which supplies current to the 223SC reset magnet upon closure of cam contacts CC—4 which automatically close once per cycle. This will initiate a new card feeding operation in a manner to be subsequently explained and the erroneous card will be delivered to the discharge magazine of the punch from which it can be removed by hand.

It will be assumed that there has been a proper and matching comparison and that the 223SC reset magnet has been automatically energized. The reset of the SC accumulator will close reset contacts 192 (Fig. 16e) and relay coil C will be energized. The energization of coil C causes closure of contacts C—1 and there is a reinitiated energization of the card feed clutch magnet 222 through a circuit traced as follows. From the 202 side of the line, through contacts F—1 which are now in the position shown, through the card feed clutch magnet 222, through cam contacts FC—6 now closed, through the stop key contacts 197 now closed, through relay contacts N—1 and C—1 now closed, through punch contacts P—1 to the other side of the line. The previously checked card which is still in the punch, upon re-initiation of card feed, will be discharged to the discharge magazine. This is brought about in the following manner. Shortly after a new card feed is initiated, cam contacts FC—4 (Fig. 16e) close, energizing relay coil B and causing closure of contacts B—2 to maintain B energized after FC—4 open. The stick circuit for B is completed through the LH reset contacts 190 now closed. The energization of B closes relay contacts B—1 and a circuit is established from the 201 side of the D. C. line, through relay contacts B—1, through the escapement contacts 154 of the punch, through switch 210, through the three-blade contacts 209 which are in shifted position for checking, out via line 236 directly to the punch magnet 237 and back to the other side of the D. C. line. The punch operating magnet 237 is then repeatedly energized under control of the escapement contacts 154 and the punch rack is escaped column by column over the field in which product punching would ordinarily occur until this zone is passed, after which the usual skip bar in the punch skips the punch rack to beyond the last column position. At this point the compared card is ejected in the usual manner. A card which does not compare is discharged through the punch in the same manner, but such card will be taken by hand from the discharge magazine of the punch.

Referring to the timing diagram (Figs. 17a and 17b) it will be noted that there are two cycles delineated as extra cycles for checking. Upon checking operations, the machine cycle to the extreme right on Fig. 17a, is the cycle which is employed for comparing the amount of the products standing in the LH accumulator with the product read from the card and standing in the SC accumulator. The following cycle, which is the first (i. e. extreme left-hand) cycle upon Fig. 17b, is the extra cycle for resetting the SC accumulator.

When the machine is to be used for simple multiplying operations without checking and comparing, such extra cycles are eliminated and the cycles of the machine proceed directly from the end of the third counter cycle on Fig. 17a and continue upon the beginning of the second counter cycle shown on Fig. 17b.

Referring again to the circuit diagram, the elimination of the extra cycles which are required for checking is effected in the following manner. For normal multiplying operations without comparing and checking, switch 204 (Fig. 16e) is thrown to the dotted line position. This switch when in this position places the re-initiation of card feed under the control of the reset of the multiplicand receiving device instead of under control of the reset of the SC accumulator.

When the machine is not to be used for comparing and checking, switch 205 (Fig. 16d) is thrown to open position. The SC accumulator can then be used for the usual accumulation of summary products and this accumulator may be reset by hand by closure of special reset key 235.

When the machine is to be used for simple multiplying purposes and when a summary of products is to be accumulated, the plug connections from plug sockets 215 are extended directly to the plug sockets 214 and the control unit is entirely dispensed with.

What is claimed is:

1. A record controlled multiplying machine with multiplying means controlled by multiplier and multiplicand entries from a record, and including a product setup means for the final product, an entry receiving device receiving from each record the product of the multiplier and multiplicand entries upon the record, which product was previously recorded upon the record, and means for comparing the product entry set up upon said entry means with the final product derived as a result of the multiplication by the multiplying means of the machine.

2. In a machine of the class described including a checking device comprising means for reading out from a record, the amount of the multiplier, the amount of the multiplicand, and the amount of a previously recorded and computed product of these factors, means for computing the product of the multiplier and the mutiplicand, and comparing means for checking the computed product with the read in product to thereby ascertain if there is a discrepancy therebetween.

3. A machine of the class described with card feeding means, a multiplicand entry receiving device, resetting means therefor, a product receiving device for checking purposes, means for resetting said last mentioned receiving device and means for selectively controlling initiation of card feed according to whether straight run first computations or check runs are to be made, including means for initiating card feed under the control of the multiplicand reset upon first run computations and means for initiating card feed under the control of the reset of the product receiving device upon check runs.

4. A machine of the class described with amount receiving means, an operation initiating means for reinitiating the operation of the machine to compute a new problem, multiple means for controlling the foregoing last mentioned means, one means of said multiple means deferring initiation until a certain number of supplemental cycles coordinated to cycles of operation of the amount receiving means are completed and the other means of said multiple means effecting an immediate re-initiation, and selective control means for controlling said multiple means according to whether the machine is to be run for first run computations or check run computations.

5. A checking device for a multiplying machine including at least a pair of readout devices, a setup comparing means intermediate the readout devices, an emitter emitting impulses through one readout device to the setup comparing means, another emitter associated with the other readout device to permit current flow through the setup comparing means and the other readout device upon agreement of the amounts standing upon both readout devices.

6. A machine of the class described including a main operating means with entry retaining sections of the machine operated from said main operating means, said sections having associated therewith checking devices and multiplying means for multiplying computations, control means for said sections and means for selectively controlling the said control means and thereby controlling the operation of various entry retaining sections of the machine under the drive of the main operating means to provide necessary supplemental cycles of certain sections of the machine on check runs and to suppress said cycles on first run multiplying computations.

7. A machine of the class described for checking a recorded product against a re-computed product, said device comprising factor entry controlled means, computing means controlled thereby for computing the product of factors previously computed and devices for setting up the recomputed product, checking means including means for reading in the previously computed recorded product means receiving said recorded product and means for comparing said read in product with the recomputed product which is set up upon the devices for receiving such recomputed product.

8. A machine of the class described including multiplying means for first run computations and checking devices including said multiplying means for check runs, means for causing operations to be performed pertaining to one record, means for reinitiating repeat operations of the machine pertaining to a following record, means for controlling the operation of the re-initiating means to provide necessary supplemental machine cycles upon check runs when the checking devices are in operation and further means to suppress said supplemental cycle upon first run of multiplying computations and selective means to select which of the last mentioned means is to be effected.

9. A record controlled accounting machine of the class described for handling records in succession, performing a series of operations pertaining to each record and repeating such operations for a following record, including a plurality of resettable data entry receiving devices, reinitiating operation control means brought into operation by and upon reset of a data entry receiving device, means for selectively adjusting the machine so that different kinds of operations can be performed for each record, said last mentioned means including means to shift control of the reinitiating means from the reset of one data entry device to another, and means providing for at least one extra machine cycle when such shift is made to enable supplemental operations to be performed which require at least one such extra machine cycle.

10. A machine of the class described, including means for reading in from a record and setting up in the machine a previously computed recorded product, means including factor receiving means and calculating means controlled thereby for setting up in the machine a product derived from the same factors which entered into the previously recorded computed product, and means for comparing such last mentioned product set up in the machine with the other product which was read in as previously recorded whereby the accuracy of such previously recorded read in product may be checked.

11. A machine of the class described which handles a series of records, performs a series of operations pertaining to each record handled and automatically initiates the effecting of operations upon a following record, said machine comprising a number of resettable entry retaining devices, means including selecting means and multiple reset control means for bringing about automatic initiation of operations pertaining to a following record under the control of the reset of one entry device or the reset of another entry device, and means providing for the omission of extra machine cycles when the reset of one entry device controls automatic initiation and providing for the introduction of extra machine cycles when the reset of another entry retaining device brings about automatic reinitiation to enable the machine to perform extra operations in conjunction with said other entry retaining device.

12. A machine of the class described with means for handling records in succession, performing a series of operations pertaining to each record and automatically initiating operations for a following record including two resettable data receiving devices one reset following the reset of the other and each data receiving device having resetting means therefor, card feeding means, means for controlling initation of card feed by and from the reset means of one or the other of said receiving devices upon reset of a selected one of said devices, means for selectively adjusting the machine so that different operations can be performed for each record handled, and a corresponding positionable control means for selectively controlling which receiving device reset means is to be controlling of card feed initiation upon reset of the corresponding receiving device.

13. A machine of the class described for checking previously recorded computed results of multiplying computations, comprising receiving means, means for entering therein product result data as recorded for each computation, means including entry receiving means, entry controlling means, means for altering the entry relation therefrom of entries in the entry receiving means, computing means controlled by the entry receiving means with result receiving means for computing by multiplication with an altered entry relation the data previously computed to obtain and set up a comparison product, and means for checking and comparing such set up comparison product with the entered recorded product to ascertain whether there is a discrepancy therebetween.

14. A machine of the class described for checking results of previously made multiplying computations, comprising receiving means, means for entering therein product result data of each previously made computation, entry receiving means, entry controlling means, and means for altering the entry relation therefrom of entries into the entry receiving means, computing means controlled by the entry receiving means with result receiving means for computing by multiplication with an altered entry relation the data previously computed to obtain and set up a comparison product, and means for checking and comparing each said setup comparison product with the corresponding entered product result data to ascertain if there is a discrepancy therebetween.

15. A machine of the class described for checking pre-computed records which have factor data and product data thereon, said machine including receiving means for the factor data and the product data, means controlled by the factor data receiving means and including a computed product receiving means for computing and entering a product based on the entered factor data in said computed product receiving means, means for comparing the entered product data with the product as computed by the machine to ascertain a possible discrepancy therebetween and control means for said last named means including the computed product receiving means.

16. A record controlled machine adapted by adjustment thereof for alternate use either as a record making machine or as a record checking machine, comprising record controlled multiplying means with result receiving means and product recording devices controlled by the result receiving means for recording product data upon records, and checking means including record controlled entry receiving means individually receiving previously recorded product results, said multiplying means with its result receiving means and comparing means for checking such entered recorded results individually against results set up upon the result receiving means, and means for selectively setting machine controls so that it can be used for either checking purposes to compare recorded product results with computed results or for effecting initial operations upon records wherein the recording means records the multiplied product upon each record.

17. A machine of the class described for checking previously computed records for accuracy, said machine including record handling means, means controlled thereby for reading out factor data from each record, receiving means for such data, computing means for recomputing products from factor data derived from each record, said computing means including means for setting up each individual product result, record reading means for reading out product data from each record, entry receiving means receiving previously computed product data read by the reading means from each record, checking means comprising means for individually comparing each individually computed product result set up upon the result receiving means with the corresponding re-computed result derived from each record and entered upon the entry receiving means, and control means for checking means, including the receiving means for re-computed data.

18. In a machine of the class described having means for sensing a record for factor representations, multiplying the factors and entering the product back on the record and having result receiving means; and including in combination means for sensing a previously recorded product, means receiving such product under the control of the last named means, checking devices controlled by the means receiving such recorded product and by the result receiving means for the multiplied product for comparing the received recorded product with the multiplied product based upon the same factors, and selective control means to adapt the foregoing means of the machine which cooperate on checking to cooperate for checking purposes wherein previously recorded products are compared by the checking comparing means of the machine and which selective control means when differently set, adapts certain of the foregoing means of the machine for first run computations wherein sensed factors are multiplied and the product entered back on the record and wherein comparing operations are eliminated.

19. A machine for checking previously computed recorded products comprising means for handling a series of records in succession, factor receiving means receiving factor data from each record, computing means controlled thereby and means upon which individual computed products pertaining to each record are set up, means for reading in from a record the previously computed product to be verified, means receiving such read in product, comparing means for comparing such read in recorded product with the corresponding computed product, and control means for said comparing means, including means upon which the computed products are set.

20. A machine of the class described for checking a recorded calculated result against a re-calculated result with both the recorded result and the component data for the calculation upon a record, including record reading means for component data and recorded calculated data, receiving means for component data, recorded calculated data and for re-calculated result data, said receiving means for component data and recorded calculated data being controlled by the record reading means therefor, calculating means controlled by the component data receiving means for re-calculating the component data and causing entries of calculated results to be effected into the calculated result receiving means and comparing checking means with control means therefor, which include the calculated result receiving means, for comparing and checking each recorded calculated result against each corresponding re-calculated result to ascertain if a discrepancy exists therebetween.

21. A machine of the class described for checking a recorded product against a re-computed product with both the recorded product and the factor data therefor upon a record, including record reading means for factor data and recorded product data, receiving means for factor data, recorded product data and computed products, said factor and recorded product data receiving means being controlled by the reading means therefor, computing means controlled by the factor data receiving means for re-computing a result based upon the factor data and for causing entries of a computed product into the computed product receiving means, and comparing checking means with control means therefor which include the computed product receiving means for comparing and checking each recorded product against each correspondingly computed product to ascertain if a discrepancy exists therebetween.

22. A machine of the class described for checking a recorded calculated amount upon a record which contains the data entering into the calculation against a re-calculated result amount based on such data, comprising receiving means for the data, the recorded calculated amount and for a recalculated result amount, record controlled means for controlling the entry of the data and the recorded calculated amount into the data receiving means and the recorded calculated amount receiving means respectively, calculating means controlled by the data receiving means for re-calculating the result amount and for entering such amount upon its receiving means, and means to compare the re-calculated result amount against the recorded calculated amount to ascertain if there is a discrepancy therebetween and control means for said comparing means including the re-calculated result amount receiving means.

23. A machine of the class described with devices for checking a recorded product against a re-computed product, said devices including factor entry receiving means, means controlling the entry of factor data thereinto, computing means controlled by the factor entry receiving means with result receiving means upon which a comparison product is entered, receiving means for a recorded product, record controlled means for entering thereinto a recorded product based upon the factors which entered into the computation of the comparison product, means for comparing the entered recorded product with the computed comparison product to determine whether they compare or not and control means for said last named means including the result receiving means for the computed comparison product.

GEORGE F. DALY.
JOHN L. RYAN.

CERTIFICATE OF CORRECTION.

Patent No. 2,088,408. July 27, 1937.

GEORGE F. DALY, ET AL.

It is hereby certified that error appears in the printed specification of the above numbered patent requiring correction as follows: Page 1, second column, line 45, for "companying" read accompanying; page 5, first column, line 52, for "erronous" read erroneous; page 9, second column, line 45, claim 12, for "corresponding" read correspondingly; page 10, first column, line 46, claim 17, strike out the words "controlled thereby" and insert the same after "means" in line 48, same claim; and that the said Letters Patent should be read with these corrections therein that the same may conform to the record of the case in the Patent Office.

Signed and sealed this 19th day of October, A. D. 1937.

Henry Van Arsdale.
Acting Commissioner of Patents.

(Seal)